(12) United States Patent
McDaniel (10) Patent No.: US 8,065,127 B2
(45) Date of Patent: Nov. 22, 2011

(54) PARTICLE SYSTEM ARCHITECTURE IN A MULTI-BODY PHYSICS SIMULATION

(75) Inventor: Richard Gary McDaniel, Hightstown, NJ (US)

(73) Assignee: Siemens Corporation, Iselin, NJ (US)

( * ) Notice: Subject to any disclaimer, the term of this patent is extended or adjusted under 35 U.S.C. 154(b) by 595 days.

(21) Appl. No.: 12/233,718

(22) Filed: Sep. 19, 2008

(65) Prior Publication Data

US 2009/0083015 A1    Mar. 26, 2009

Related U.S. Application Data (60) Provisional application No. 60/974,571, filed on Sep. 24, 2007.

(51) Int. Cl.
G06G 7/50    (2006.01)

(52) U.S. Cl. .......................................... 703/9; 345/473

(58) Field of Classification Search ...................... 703/6
See application file for complete search history.

(56) References Cited

U.S. PATENT DOCUMENTS

| | | | | |
|---|---|---|---|---|
| 5,377,129 A * | 12/1994 | Molvig et al. | ...................... | 703/9 |
| 5,438,526 A * | 8/1995 | Itoh et al. | .......................... | 703/2 |
| 6,040,840 A * | 3/2000 | Koshiba et al. | ............... | 345/441 |
| 7,441,206 B2 * | 10/2008 | MacPhee | ...................... | 715/853 |
| 7,518,611 B2 * | 4/2009 | Boyd et al. | ...................... | 345/473 |
| 7,739,479 B2 * | 6/2010 | Bordes et al. | ...................... | 712/1 |
| 7,932,909 B2 * | 4/2011 | Niles et al. | ...................... | 345/474 |
| 7,948,485 B1 * | 5/2011 | Larsen et al. | ................. | 345/420 |

OTHER PUBLICATIONS

Su et al, "A Programmable Particle System Framework for Shape Modeling", International Conference on Shape Modeling and Applications, 2005, pp. 114-123.*

Lindblom, Marcus, "An Embedded Language for Simulating and Visualizing Particle Systems", May 12, 2003, obtained from:http://www.yar.nu/macke/hspark/report-2003-05-12.pdf.*

Overmars, Mark, "Designing Games With Game Maker", Version 6.1A, date unavailable.*

Lewis et al, "Maya® 5 Fundamentals", January 23, 4004, Chapter 15.*

YoYo Games, "Game Maker 6.1", downloaded from http://wiki.yoyogames.com/index.php/GM6.1, and "Game Maker 6.1a", downloaded from http://wiki.yoyogames.com/index.php/Game_Maker_6.1a.*

* cited by examiner

*Primary Examiner* — Mary C Jacob (57) ABSTRACT

An architecture tangibly embodied on a computer readable medium, the architecture for creating a particle system to be used in a physical simulation, including: a plurality of particle generation modules, wherein a particle generation module generates particles in a particle system; a plurality of particle motion modules, wherein a particle motion module produces physical motion of particles in a particle system; a plurality of particle display modules, wherein a particle display module renders particles in a particle system; a plurality of target effect modules, wherein a target effect module modifies particles in a particle system to perform in a certain way when they collide with an object; and a plurality of particle data structures.

14 Claims, 10 Drawing Sheets

```
class particle_system {
      particle header information
      pointer to array of particles
} class generate_module {
      reference to particle_system ps
      virtual function generate (float time)
} class move_module {
      reference to particle_system ps
      virtual function move (float time)
} class effect_module {
virtual function collide (particle_system ps, obj_shape surface)
} class display_module {
      reference to particle_system ps
      virtual function draw (window w)
} class geometry_handler {
      virtual function generate () returns particle
}
```

FIG. 4

```
// a simulation time step is executed to advance the state
// of the simulation forward in time
procedure simulation_time_step (float time) {
        for each move_module m {
                m.move (time)
        }
        for each generate_module g {
                g.generate (time)
        }
}
procedure simulation_collision (set of obj_shape,
                                        set of particle_system) {
        find all collisions between the set of object shapes and
                the bounding extents of the particle systems
for each collision (ps, surface) {
        effect_module func = search for registered effect module
                between ps and surface type
        if (func != null) {
                func.collide (ps, surface)
        }
        }
}
procedure display_draw (window w) {
        for each draw_module d {
                d.draw (w)
        }
}
```

FIG. 5

```
class point_geom : inherits geometry_handler {
        point position
        override function generate () {
                    particle p
                    p.set_val (POSITION, position)
                    return p
        }
} class fixed_rate : inherits generate_module {
        float rate
        float carryover
        geometry_handler geom.
        vector initial_velocity override function generate (float time) {
                    carryover += 1 / rate
                    while (carryover > time) {
                       carryover -= time
                       particle p = geom.generate ()
                       p.set_val (VELOCITY, initial_velocity)
                       ps.add_particle (p)
                    }
        }
} class ballistic : inherits move_module {
        float gravity override function move (float time) {
                    for each particle p in ps {
                       vector velocity = p.get_val (VELOCITY)
                       velocity.z += gravity * time
                       p.set_val (VELOCITY, velocity)
                       point position = p.get_val (POSITION)
                       position += velocity * time
                       p.set_val (POSITION, position)
                    }
        }
}
```

FIG. 6A

```
class follow_surface : inherits move_module {
    float gravity
    reference to particle_system fall_off override function move (float time) {
        for each particle p in ps {
            vector normal = p.get_val (SURFACE_NORM)
            vector par, perp = decompose gravity
                    vector [0,0,gravity] into components that
                    are parallel and perpendicular to
                    normal vector
            vector velocity = p.get_val (VELOCITY)
            velocity += perp * time
            p.set_val (VELOCITY, velocity)
            point position = p.get_val (POSITION)
            position += velocity * time
            obj_shape surface = p.get_val (SURFACE)
            if (angle of surface normal is too high) {
                    ps.remove_particle (p)
                    fall_off.add_particle (p)
            }
            else if (position is not on surface facet) {
                    if (position is near adjacent surface facet) {
                            p.set_val (SURFACE_NORM, normal of
                                    adjacent surface facet)
                            position = shift point to be
                                    on adjacent surface facet
                            p.set_val (POSITION, position)
                    }
                    else {
                            ps.remove_particle (p)
                            fall_off.add_particle (p)
                    }
            }
            else {
                    p.set_val (POSITION, position)
            }
        }
    }
}
```

FIG. 6B

```
class condense : inherits effect_module {
    particle_system condenser override function collide (particle_system ps,
                              obj_shape surface) {
        for each particle p in ps {
            if (p is touching surface) {
                ps.remove_particle (p)
                p.set_val (SURFACE, surface)
                vector normal = get normal of surface at
                        the position of the particle
                p.set_val (SURFACE_NORM, normal)
                condenser.add_particle (p);
            }
        }
    }
} class draw_dots : inherits display_module {
    override function draw (window w) {
        for each particle p in ps {
            point pos = p.get_val (POSITION)
            w.draw_point (pos.x, pos.y)
        }
    }
}
```

FIG. 6C

```
procedure set_up_simulation () {
        particle_system falling (POSITION, VELOCITY)
        particle_system sliding (POSITION, VELOCITY,
                                 SURFACE, SURFACE_NORM)
    point_geom start_pnt
    start_pnt.position = [x, y, z of starting position]

fixed_rate generator
    generator.ps = falling
    generator.geom = start_pnt
    generator.rate = 25 particles per second
    generator.velocity = [0, 0, 0]
    register_generate_module (generator)

draw_dots draw_falling
    draw_falling.ps = falling
    register_draw_module (draw_falling)

draw_dots draw_sliding
    draw_sliding.ps = sliding
    register_draw_module (draw_sliding)

obj_shape plane_object
    condense hit_surface
    hit_surface.ps = falling
    hit_surface.condenser = sliding
    register_collision_effect (plane_object, hit_surface)

ballistic falling_movement
    falling_movement.ps = falling
    falling_moving.gravity = 9.8 meters per second squared
    register_move_module (falling_movement)

follow_surface sliding_movement
    falling_surface.ps = sliding
    falling_surface.gravity = 9.8 meters per second squared
    register_move_module (sliding_movement)
}
```

PARTICLE SYSTEM ARCHITECTURE IN A MULTI-BODY PHYSICS SIMULATION

CROSS-REFERENCE TO RELATED APPLICATION

This application claims the benefit of U.S. Provisional Application No. 60/974,571, filed Sep. 24, 2007, the disclosure of which is incorporated by reference herein in its entirety.

BACKGROUND OF THE INVENTION

1. Technical Field

The present invention relates to particle systems, and more particularly, to a particle system architecture for use in creating physical simulations.

2. Discussion of the Related Art

Particle systems are used for a variety of purposes in computer applications. Common uses include generating special effects in video games and movies, and simulating physical processes. Though the calculations behind particle systems are common and well understood, programming libraries to produce a particle system are less common. Most often, simulation programmers create the particle system code for a new application by themselves.

To be useful, a particle system library needs to have links to other systems within the application. As a result, particle system libraries found in game engines include links to features such as graphics, collision detection, and game behaviors, for example. In other applications, such as physical simulation, particle systems are used but are not customizable. For example, a robot painting simulation may use particles to simulate paint covering a surface, however, the user does not have access to the underlying technology or the ability to change the particle system's effects.

In most cases, a particle system is created manually by writing custom code in a programming language like C++, for example. The particle system is generally used for a specific application and is not applicable to any other. For example, a smoke simulation can be implemented using a particle system. To do this, the simulation programmer first determines an algorithm for simulating smoke using a particular particle based model. Then, the programmer writes code that encapsulates the equations of the model and applies it to an array-like data structure that represents the particles' state. All programming aspects are the programmer's responsibility including allocating the memory, keeping track of the particles' state, writing the algorithms for evolving the particles' state over time, and determining what happens when the particles reach other objects in the simulation. There is no module or library structure to the code and any code reuse results from copying and pasting snippets from another source.

Game engines sometimes include a particle system library, but these are highly variable. A sophisticated game engine may have a customizable particle system library with several modules. However, these particle systems are designed for producing graphical effects and do not have a means for producing simulated physical effects as would be desired in a simulation. For example, a particle system in a game engine might have many display parameters that control how each particle changes color over time and what graphical images to use to display the particles.

Some custom simulation systems, such as a robot painting may include a particle system as their means of implementation. However, these kinds of particle systems are hardwired into the system and not accessible to a programmer. Their purpose is to perform a specific simulated activity within the context of the application. The amount of customization that the user has over the particle system depends on the specific application.

Having to write a particle system using custom programming can be difficult and prone to errors. For example, since one is writing the system from scratch and time is limited, it is difficult to add new features or to make the simulations more sophisticated. As a result, hand-written particle systems tend to provide only as many functions as are absolutely needed and may leave out useful features.

Particle systems in game engines vary greatly in sophistication. Some are simple Newtonian solvers that allow a particle to follow arc-like trajectories. These are not always useful in a physical simulation. Further, since even the better particle system libraries in game engines are directed to creating special effects, the programmer has few options to control the effects of the particles on other objects in the system. The particles are there to look good and provide many display and animation features. In a physical simulation, however, having the particle effect other objects, such as painting a surface, moving a turbine or transferring a liquid, is often more important.

The particle systems in custom applications can be useful for their intended purpose, but are not a customizable programming system. For example, since a programmer does not have access to the application's implementation, there is no way to modify the particle simulation to have it do anything else.

SUMMARY OF THE INVENTION

In an exemplary embodiment of the present invention, there is provided an architecture tangibly embodied on a computer readable medium, the architecture for creating a particle system to be used in a physical simulation, comprising: a plurality of particle generation modules, wherein a particle generation module generates particles in a particle system; a plurality of particle motion modules, wherein a particle motion module produces physical motion of particles in a particle system; a plurality of particle display modules, wherein a particle display module renders particles in a particle system; a plurality of target effect modules, wherein a target effect module modifies particles in a particle system to perform in a certain way when they collide with an object; and a plurality of particle data structures, wherein a particle data structure stores and maintains a state of particles in a particle system, wherein a particle system for a physical simulation is created by selecting as many of the modules and data structures needed for the physical simulation and combining the selected modules and data structures into a procedure to be run on a computer.

A particle data structure includes a first group of particle data that is updated during the physical simulation and a second group of particle data that is held constant during the physical simulation.

At least two of the particle data structures have different particle data formats, and wherein the particles in the first groups of the at least two particle data structures can be transferred from one of the particle data structures to another.

The particles in the first groups of the at least two particle data structures are transferred from one of the particle data structures to another via a target effect module or a particle motion module.

The target effect module or the particle motion module effectuates the transfer of a particle in a first location in the first group of a first one of the at least two particle data structures to a corresponding first location in the first group of a second one of the at least two particle data structures by: deleting a particle in the corresponding first location in the first group of the second one of the at least two particle data structures and replacing it with the particle in the first location in the first group of the first one of the at least two particle data structures.

The architecture further comprises a means for enabling the creation of new particle generation modules, particle motion modules, particle display modules, target effects modules and particle data structures.

The plurality of particle generation modules, plurality of particle motion modules, plurality of particle display modules, plurality of target effect modules and plurality of particle data structures are stored in a library on the computer.

When the procedure is run on the computer, the physical simulation is rendered on a display connected to the computer.

The physical simulation is a multi-body physics simulation.

The architecture further comprises a plurality of placer functions, wherein a placer function identifies a location at which a particle is generated.

The placer functions comprise point placers, shape-based placers, volume placers, sphere placers, and area placers.

In an exemplary embodiment of the present invention, a method for creating a physical simulation that includes a particle system, comprises: accessing a particle system library to create a particle system to be included in a physical simulation, the particle system library including: a plurality of particle generation modules, wherein a particle generation module generates particles in a particle system; a plurality of particle motion modules, wherein a particle motion module produces physical motion of particles in a particle system; a plurality of particle display modules, wherein a particle display module renders particles in a particle system; a plurality of target effect modules, wherein a target effect module modifies particles in a particle system to perform in a certain way when they collide with an object; and a plurality of particle data structures, wherein a particle data structure stores and maintains a state of particles in a particle system; retrieving modules from the particle system library that are needed to create the particle system in the physical simulation; composing the physical simulation to include the particle system by using the retrieved modules; and executing the physical simulation after it has been composed.

The method further comprises displaying the composed physical simulation as it is being executed.

In an exemplary embodiment of the present invention, a system for creating a physical simulation of three-dimensional (3D) graphical objects, comprises: an input that receives user input; a memory that includes a particle system library and program code for physically simulating 3D graphical objects, the particle system library including: a plurality of particle generation modules, wherein a particle generation module generates particles in a particle system; a plurality of particle motion modules, wherein a particle motion module produces physical motion of particles in a particle system; a plurality of particle display modules, wherein a particle display module renders particles in a particle system; a plurality of target effect modules, wherein a target effect module modifies particles in a particle system to perform in a certain way when they collide with an object; and a plurality of particle data structures, wherein a particle data structure stores and maintains a state of particles in a particle system; a processor that executes the program code for physically simulating the 3D objects; and a display that displays the 3D objects as it is being physically simulated.

The 3D objects comprise a particle system.

The foregoing features are of representative embodiments and are presented to assist in understanding the invention. It should be understood that they are not intended to be considered limitations on the invention as defined by the claims, or limitations on equivalents to the claims. Therefore, this summary of features should not be considered dispositive in determining equivalents. Additional features of the invention will become apparent in the following description, from the drawings and from the claims.

DETAILED DESCRIPTION OF EXEMPLARY EMBODIMENTS

An exemplary embodiment of the present invention is directed to an architecture for creating a particle system that can be used in a physical simulation such as multi-body physics. The present invention provides a general library of particle generators, motion solvers, displays, and effects that can be composed for a given application.

The architecture divides the particle system into four modular components. In principle, it is possible to exchange modules of the same type but with different functions to produce different particle behavior. The modules are: particle generation, particle motion, particle display, and target effect. Modules are implemented using object-oriented programming style. Each module is an object with data and methods. Key methods are inherited from a base class and must be implemented, but the modules can have individual methods and data that are specific to the kinds of tasks they perform.

A description of core aspects of the architecture will now be provided.

Particle Data Format

To accommodate the different module implementations, particles are given a common data format that is passed between modules as different tasks need to be accomplished. At minimum, the particle data must include a 3D position but additional, independent data can be included to address the concerns of a given module. For example, if the particle moves in a ballistic trajectory, the motion module needs each particle to have a velocity vector. If the particle is moving to follow a surface (such as running fluid), then the motion module needs a velocity and it also needs to know the model of the surface being followed and the surface normal at each particle's current position. The particle data is created as header information and an array of particle state. The header information contains the size of the particle data as well as the order and type of each data field entry. Modules use the header information to determine the offsets into the particle data for each field that it needs to perform computation. The maximum number of particles for a given set of modules is determined by the size of the array. The total size of the array as well as the number of particles currently active is maintained in the particle data as well. The size of the array can be kept constant or can be dynamically adjusted to accommodate different numbers of particles.

Particle data is broken into two groups. The first group is updated during simulation and the other is held constant for display purposes. In a simulation environment, the calculations performed for the simulated behavior can occur at a different rate than the display is refreshed. For example, the simulated behavior might be updated at a rate of 5 ms per step to keep up with an external process like a controller. A typical display refresh rate can be 20 frames per second that computes to 50 ms per frame and thus can be ten times longer than the simulation step. The behavior of the particles is part of the simulation so they must be updated at the simulation's update rate so whenever the display is about to be updated, the simulation process is suspended and the particle data is copied over into the second array that only contains information that the particle display requires. After copying is complete, the simulation is resumed and proceeds at its own pace.

A transferred particle may have a different data format and behavior. This is so because a first particle data structure (where it originates) and a second particle data structure (where it ends up) can possess a different set of data elements with different data types and behaviors.

Particle Generation Module

Particle generation is concerned with how particles are produced and inserted into the system. The simulation system calls the particle generation modules every time step telling the generators the current simulation time. In a typical situation, particles are added to the system at some rate like a fixed number of particles per second. The particle generation module allows any criteria to be used to determine how many particles to add. A new particle is added to the system by storing its initial state in the next free position in the particle array. Particles in the array are kept contiguous for the benefit of other modules. Particles will typically have a limited duration so that the particle array does not overflow.

Though particle generation modules are specifically concerned with creating particles, other modules are allowed to add and remove particles from the particle data. For example, when a target effect module is used, it can remove a particle from the data to act as though the particle was absorbed by an object.

Shape-Based Placer Function

Generated particles are created with a starting location. The particles might emanate from a single point, but it is also possible that the simulation calls for particles to form along a line, surface, or within a volume. To assist the simulation programmer, the invention provides shape-based placer functions. The geometry of space where particles form is provided to the shape placer. The placer will automatically divide the geometry into a set of points, lines, triangles or tetrahedrons to convert the geometry into simpler shapes. For example, a circular area is converted into a set of triangles whereas a spherical volume is segmented into tetrahedrons. The simulation programmer assigns the shape placer with a particle generation module that will then generate points within that shape's geometry.

The shape-based placer may be an area placer, a sphere placer or a volume placer, for example.

Particle Motion Module

Particle motion modules produce the physical motion behavior of each particle. The simulation system calls the motion modules every time step. Motion modules use the rules of physics to compute particle positions over time. Motion modules can also apply other rules needed by the application. For example, a ballistic motion module will update each particle to follow a falling path dictated by the particle's current velocity and gravity. A misting motion module can have particles move about in random directions like a cloud. A more complex motion module can have particles follow a surface such as water drops running over the side of a container. The motion module is responsible for creating and maintaining meta-data for the particles' positions. For example, the simulation's collision detection algorithm will normally need to know bounding box information to compute collisions effectively.

Target-Effect Module

The target effect module is different from the other two simulation based modules in that it is not called directly in the simulation step but instead is called indirectly when there are collisions. The simulation system is responsible for determining when objects come into contact via its collision detection system. Collision detection for particles is computed in aggregate to reduce computation costs. Groups of particles are treated as a single aggregate object and collision detection occurs between the aggregate's bounding region and other objects in the system. When a collision is detected between a group of particles and another object, the system refines its analysis by computing whether each individual particle in the aggregate collides with the other object. When a particle is determined to collide with an object, the object's shape description is checked for target effect modules. The system calls the target effect module for each collision. To reduce computation costs, it is also possible to record when several particles collide with corresponding objects at the same time and call the target effect modules once per collided object or once per simulation step.

The role of the target effect modules is to modify the particle or perform another simulation behavior when particles collide with things. For example, a target effect can cause the collided object to impinge a force on the collision object like wind striking a propeller. Another effect would be to have the particle bounce off of the object. Still another effect would be to have the object change the color of the location of the collision. This would simulate the effect of spraying paint on the object. The target effect could also record the collision with or without taking actions.

Target effect modules can be complex. For example, the paint spraying function mentioned above requires a method for recording where particles have struck the object over the object's lifetime. This can be implemented as a texture map that is effectively a set of bitmaps that are positioned in 3D space relative to the surfaces of the 3D object. The bitmaps are dynamically allocated for the object and modified during simulation. A second bitmap is stored for rendering the object because rendering and simulation can occur at different rates.

Particle Display Module

The particle display module is executed by the rendering part of the simulation application and not during the simulation step. The display module's role is to use the drawing functions provided by the simulation application to render the particles in some way. A particle array can be rendered as individual points, or a module can compute a figure or graph from the particles and draw something more complicated. For example, the module might compute the bounding region or density of the particles and render a cloud-like haze where particles are located.

An example of the above-described particle system architecture as it is applied to the creation of a physical simulation, will now be described.

In creating a physical simulation, the simulation programmer can provide as many different modules as is demanded by the application. The architecture is designed to allow combinations of modules to be applied to as many sets of particle data as needed. For example, the programmer can combine a ballistic motion module with a painting target effect and a bouncing reflection target effect. This would cause particles to bounce off an object but leave a mark wherever they hit. The programmer might combine a bitmap display module with a tail display module to render particles as icons with a trailing path following behind like streamers.

Figure 1:
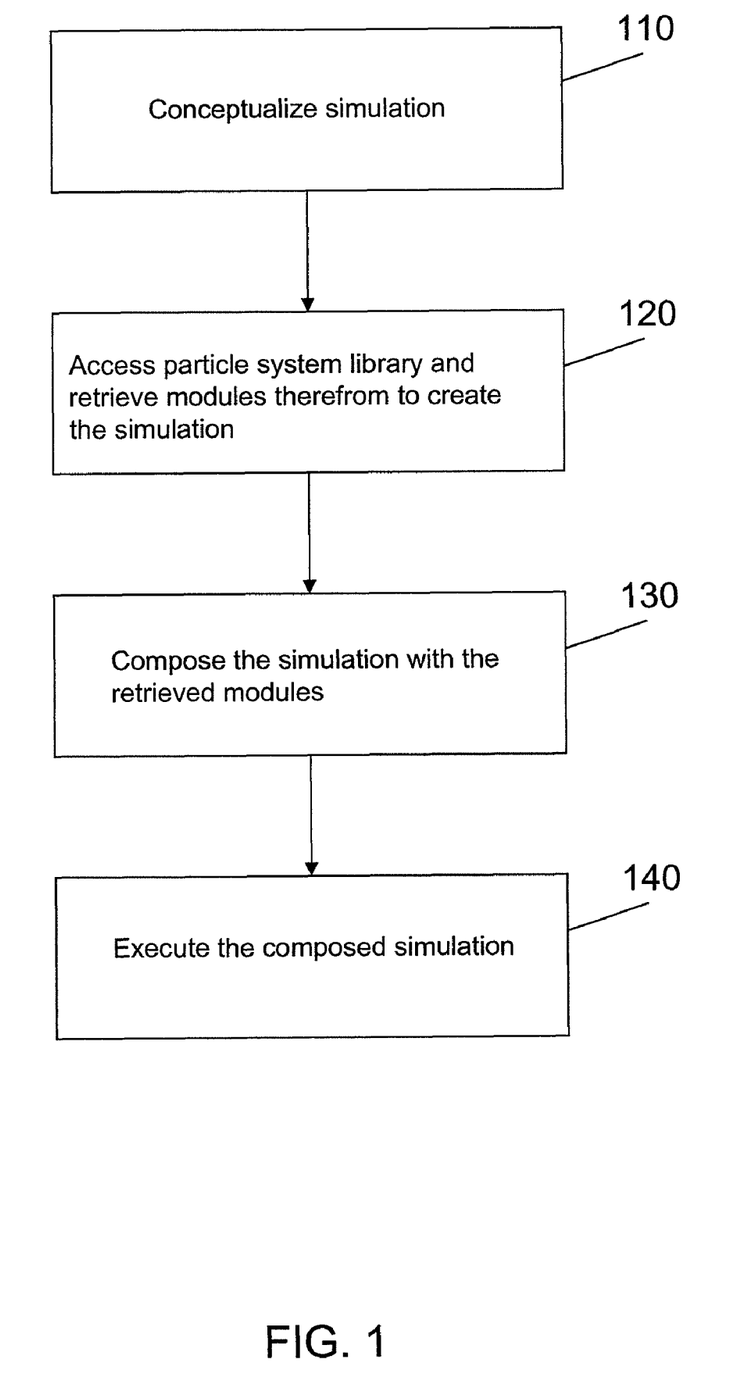
FIG. 1 is a flow diagram of a method in accordance with an exemplary embodiment of the present invention.

A method for creating a physical simulation in accordance with an exemplary embodiment of the present invention is illustrated in FIG. 1. As shown in FIG. 1, a simulation programmer first conceptualizes a simulation that they want to generate (110). For example, the simulation programmer may decide to generate the simulation shown in FIG. 2.

Figure 2:
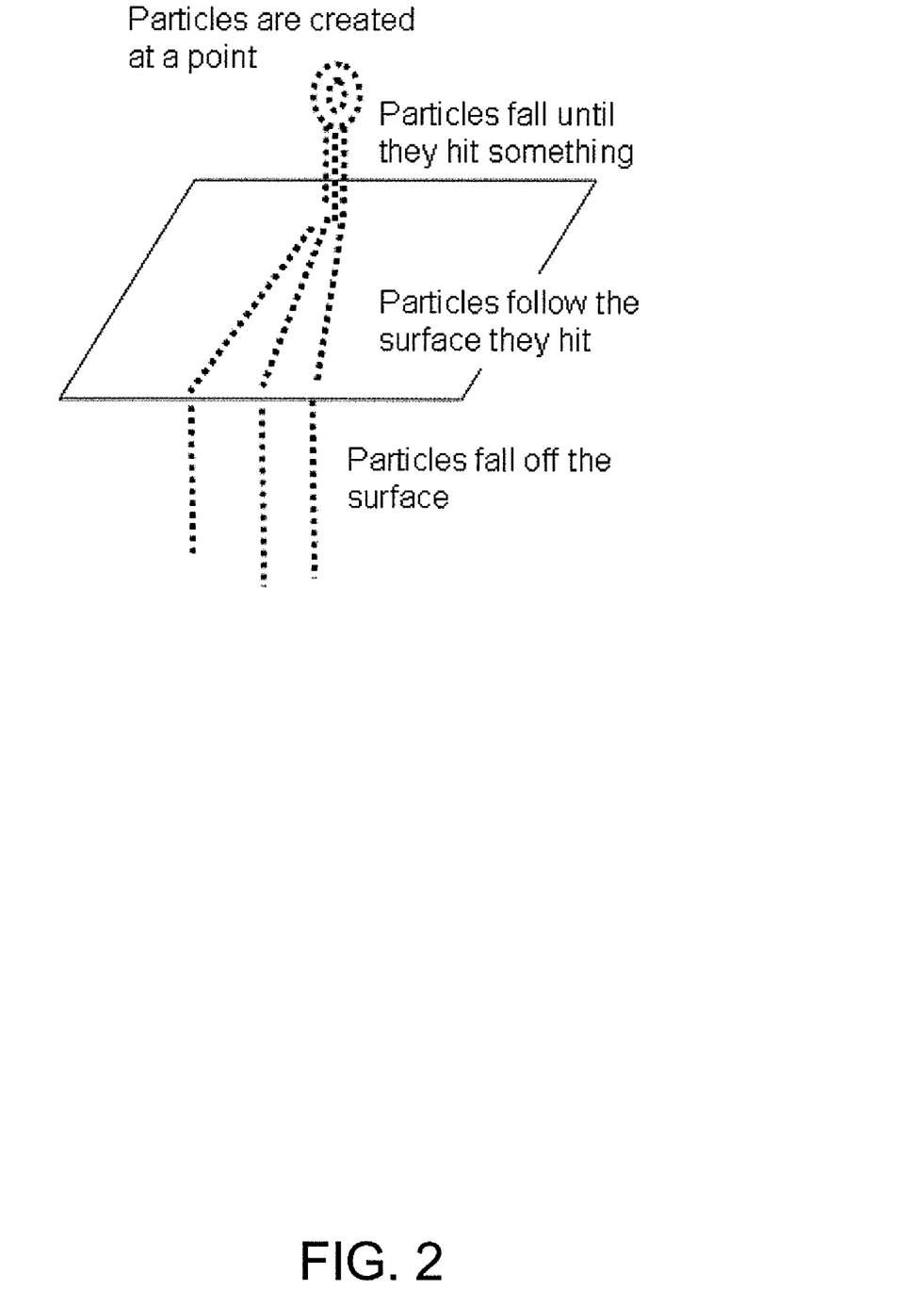
FIG. 2 is an example particle system.

In the simulation shown in FIG. 2, a particle system is used to simulate a liquid falling and striking a surface. The liquid flows on the surface until it reaches the edge where it falls off again. To build this scenario, the programmer accesses a particle system library, which includes, for example, all the above-described modules, and retrieves the modules to create the simulation (120). The programmer then composes the simulation with the retrieved modules (130).

Figure 3:
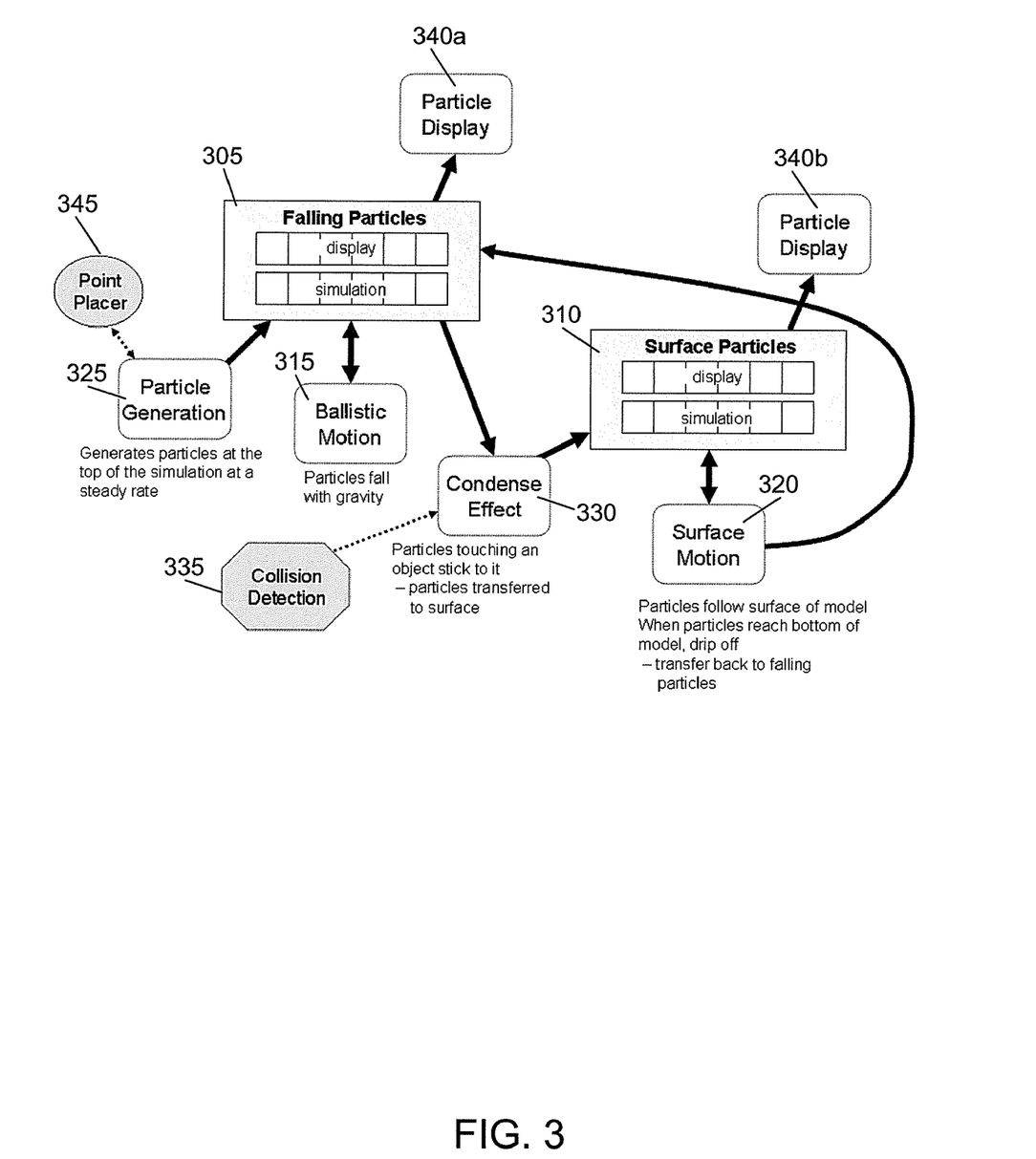
FIG. 3 is a set of modules, in accordance with an exemplary embodiment of the present invention, that implements the simulation shown in FIG. 2.

For example, as shown in FIG. 3, the programmer uses two particle data arrays, one for falling particles 305 and the other for particles running on the surface 310. The falling particles 305 use a ballistic motion module 315 and the running particles 310 use a surface-following module 320. A point-based particle generator 325 creates new particles above the surface and puts them into the falling particles array 305 so that they will start falling. A condensing target effect 330 occurs whenever any of the ballistic particles collide with the surface of the object as determined by a collision detection system 335. The target effect 330 removes the colliding particles from the falling particles array 305 and adds a new particle to the surface particles array 310. The position property of the new particle is set to match the location of the removed ballistic particle exactly. The condense effect 330 also records the model parameters of the surface such as its normal vector so that the surface motion module 320 can compute properly. The surface motion module 320 moves its particles along the surface but it can also detect when a particle falls off. For example, the particle can drop when the surface normal angle points downward instead of up. At that point, the surface motion module 320 transfers the particle back to the falling particles array 305. It does this by adding the particle to the falling particles array 305 and deleting the particle from the surface particles array 310 at the same location. The application shown in FIG. 3 also has display modules 340a and 340b for rendering the particles. In this case, the display modules 340a and 340b can render the particles as a set of points. The application shown in FIG. 3 further includes a point placer 345 (i.e., a shape-based placer) that is a starting location for the particles.

The composed simulation is then executed (140). For example, a computer runs the simulation and it is displayed on a screen thereof.

A description of pseudocode that can implement the simulation in FIG. 2 is now presented.

The entire implementation of the simulation system is not shown, however, elements of the simulation system that interact with the particle system are described. The simulation system uses two processes: 1) the main process that computes the state of the simulation objects including the particle system—this process also computes collision detection of the particle objects with other objects in the system such as a surface; and 2) a second process that displays the results of the simulation system.

Figure 4:
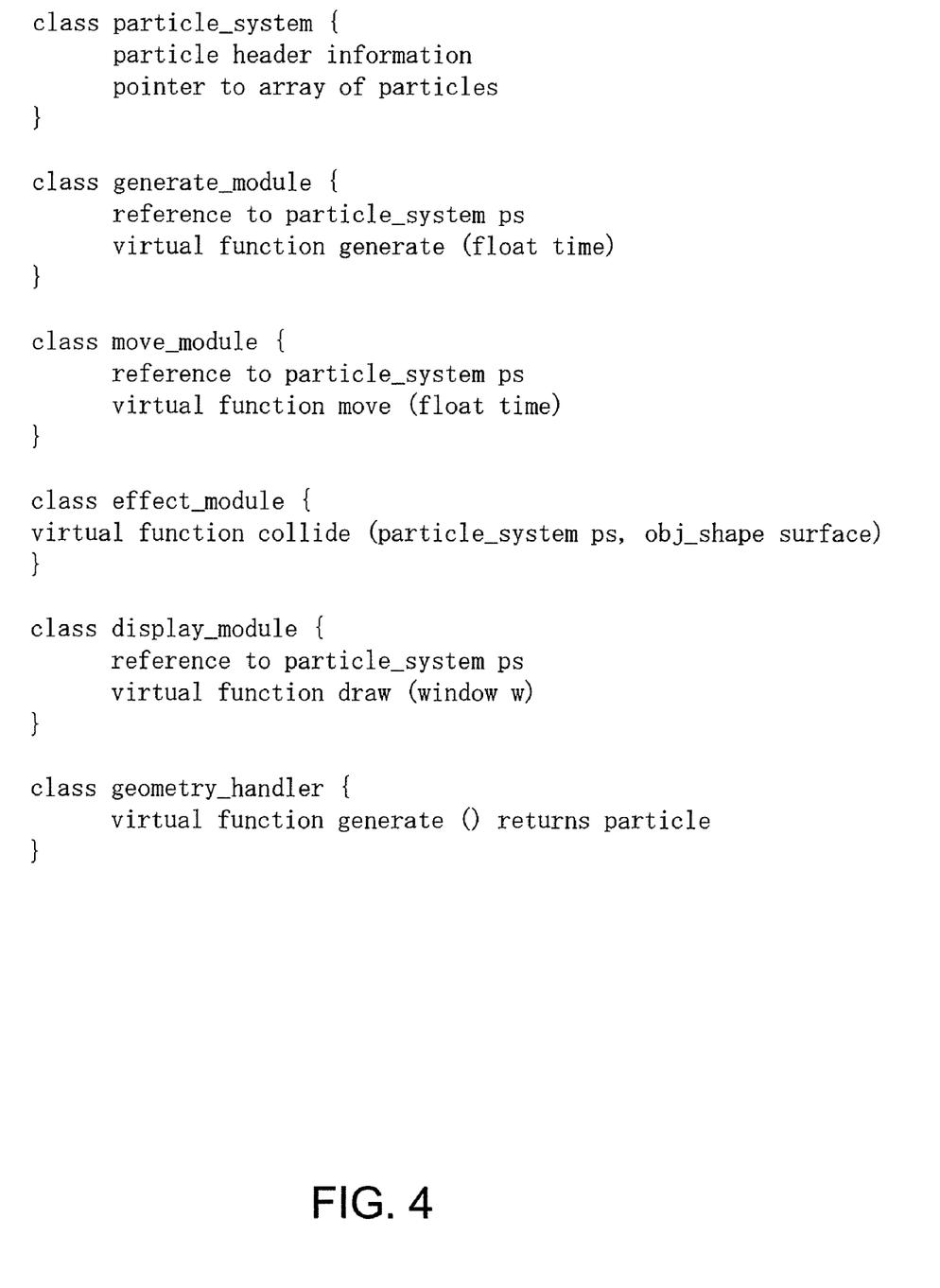
FIG. 4 is a set of classes, in accordance with an exemplary embodiment of the present invention, by which the modules in FIG. 3 may be defined.

A set a possible object-oriented class definitions for the particle system is shown in FIG. 4. The "particle_system" class is provided for particle data array representation. The "generate_module," "move_module," "effect_module," and "display_module" classes are used to define the generate, move, effect, and display modules respectively of the particle system. The programmer would define new sub-classes inheriting from these definitions as needed to create modules with new capabilities and implementations. The "geometry_handler" class is used to define a shape-placer function.

Figure 5:
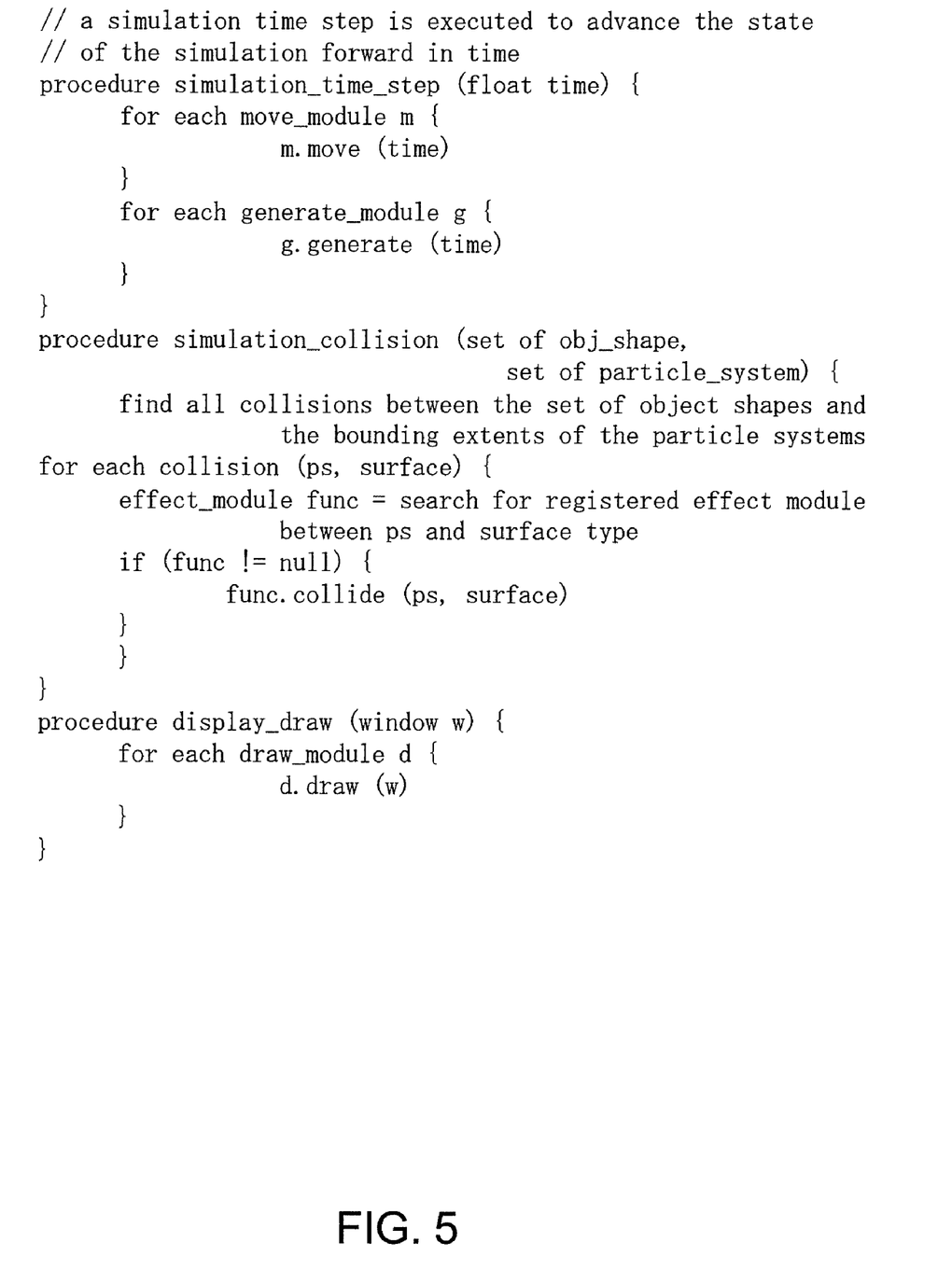
FIG. 5 is a set of procedures, in accordance with an exemplary embodiment of the present invention, that can implement a means for satisfying the conditions of a physical simulation.

The procedures listed in FIG. 5 show implementations of elements of a simulation system. Normally, these procedures would be internal to the system. The "simulation_time_step" procedure implements the system's calculation during a single simulation time step. It shows how the system will call the particle system's motion and generation modules. The "simulation_collision" procedure implements the system's response to collision detection. The simulation system uses a method to determine when the regions of simulated objects collide and calls the procedure for each pair of colliding objects. The implementation of the simulation_collision procedure shows how it will call the target effect modules of the particle system. The "display_draw" procedure implements the simulation system's graphical display. The simulation system would call the display_draw procedure every time the contents of the graphical display is to be refreshed. The display_draw procedure shows that the simulation system calls the particle system's display modules.

Figure 6A:
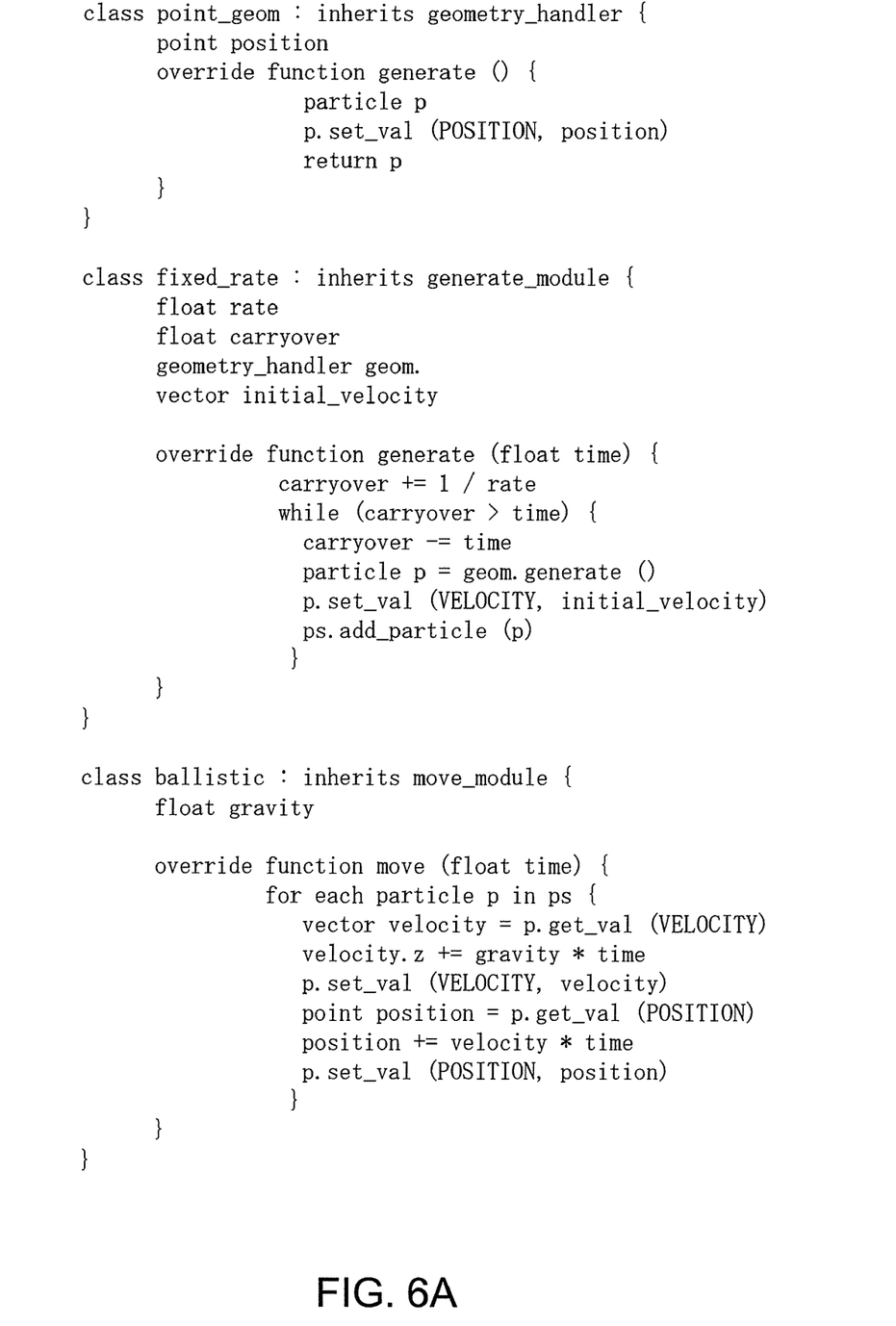
FIGS. 6A-6C show a set of classes, in accordance with an exemplary embodiment of the present invention, that can implement a means of simulating the effects of the example shown in FIG. 2 with the class definitions in FIG. 4.
Figure 6B:
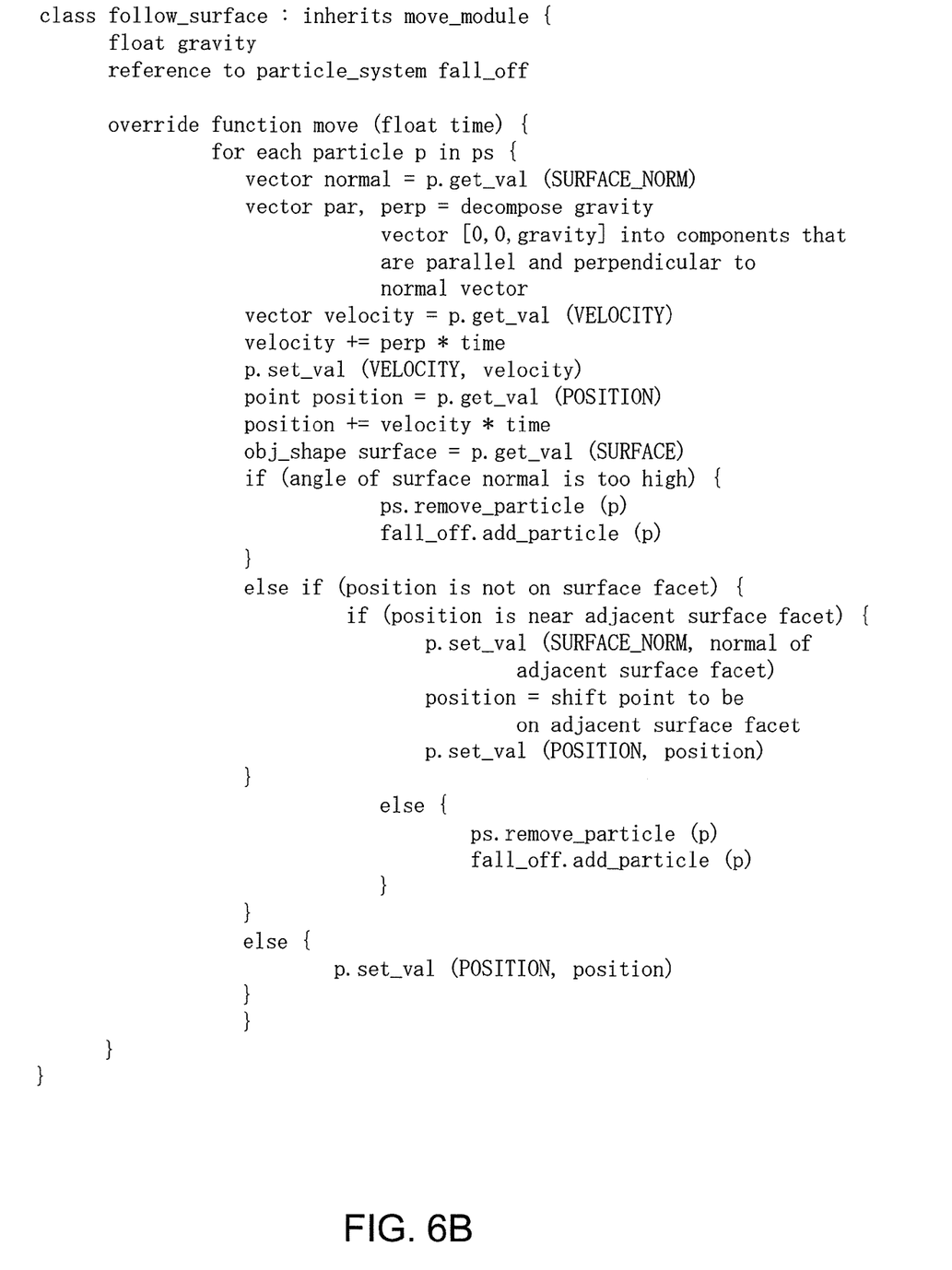
Figure 6C:
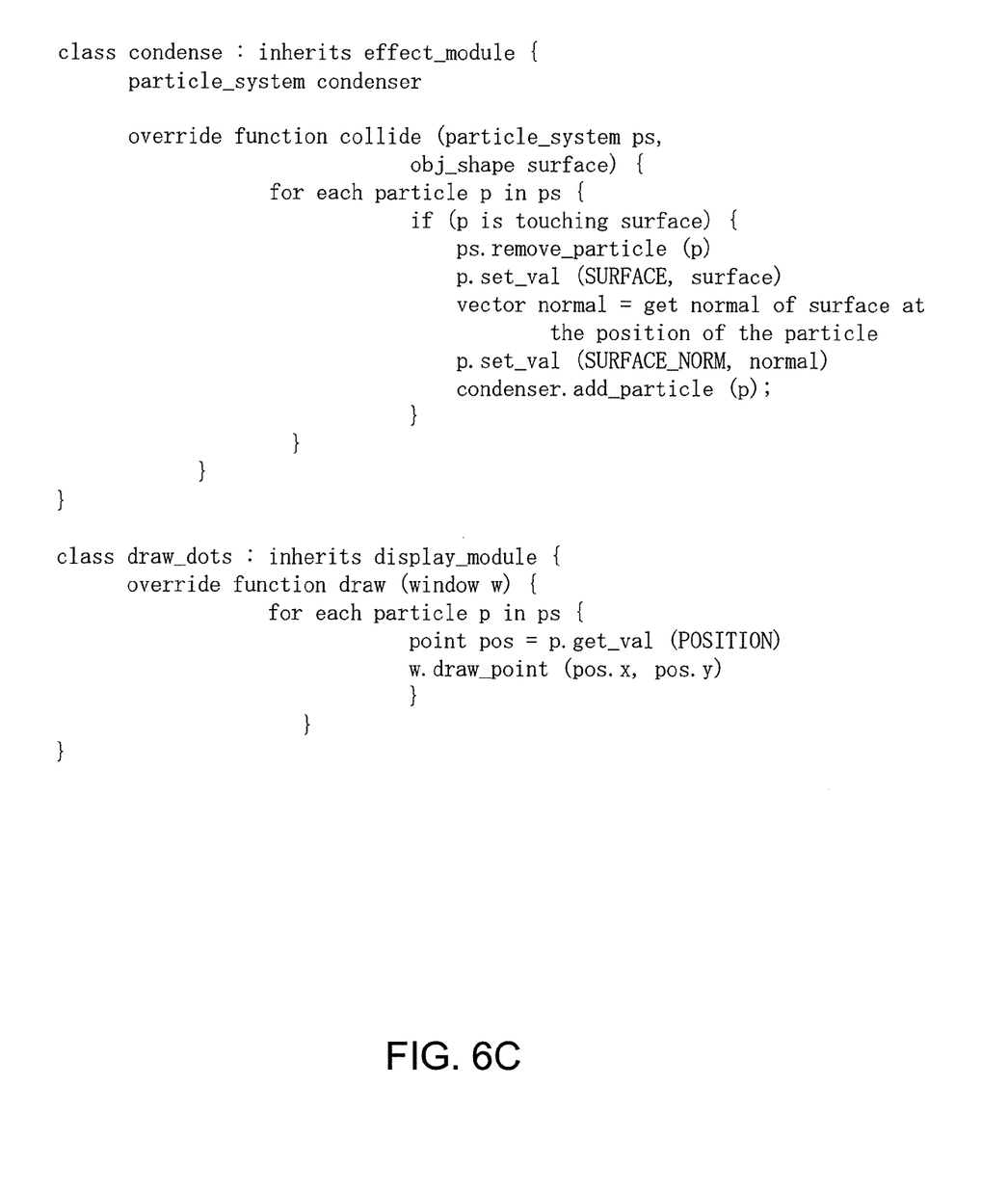

The sub-classes shown in FIGS. 6A-6C are used to implement modules for the particle system. The sub-class "point_geom" in FIG. 6A inherits the geometry_handler class and is used to specify a single point geometry. When invoked, the point_geom sub-class returns a single point. More complex geometry handler implementations can return points within a line, in a plane, or in a volume. The sub-class "fixed_rate" in FIG. 6A inherits the generate_module class. The fixed_rate sub-class implements a point generator for the particle system. The fixed_rate implementation creates new points at a fixed rate over a period of time. The fixed_rate sub-class uses a geometry handler to determine where the points are placed in the particle system. The sub-class "ballistic" in FIG. 6A inherits the move_module class. The ballistic sub-class implements a falling motion method that updates the position of particles based on Newtonian motion under a constant gravitational force. The sub-class "follow_surface" in FIG. 6B inherits the move_module class. The follow_surface sub-class implements a different way to move particles than the ballistic sub-class. The follow_surface sub-class updates the position of particles so that they track the position of a modeled surface. The sub-class uses the object with which the particle collides to determine the orientation of the surface at the position of the particle and moves the particle to follow the surface. It also detects when the particle moves off the edge of the surface and transfers any particles that fall off the edge to a different particle data array. The sub-class "condense" in FIG. 6C inherits the effect_module class. The condense sub-class implements a target effect that transfers particles that collide with a surface to another particle data array. The sub-class "draw_dots" in FIG. 6C inherits the display_module class. The draw_dots sub-class is used to draw particles as dots in a two-dimensional graphical display.

Figure 7:
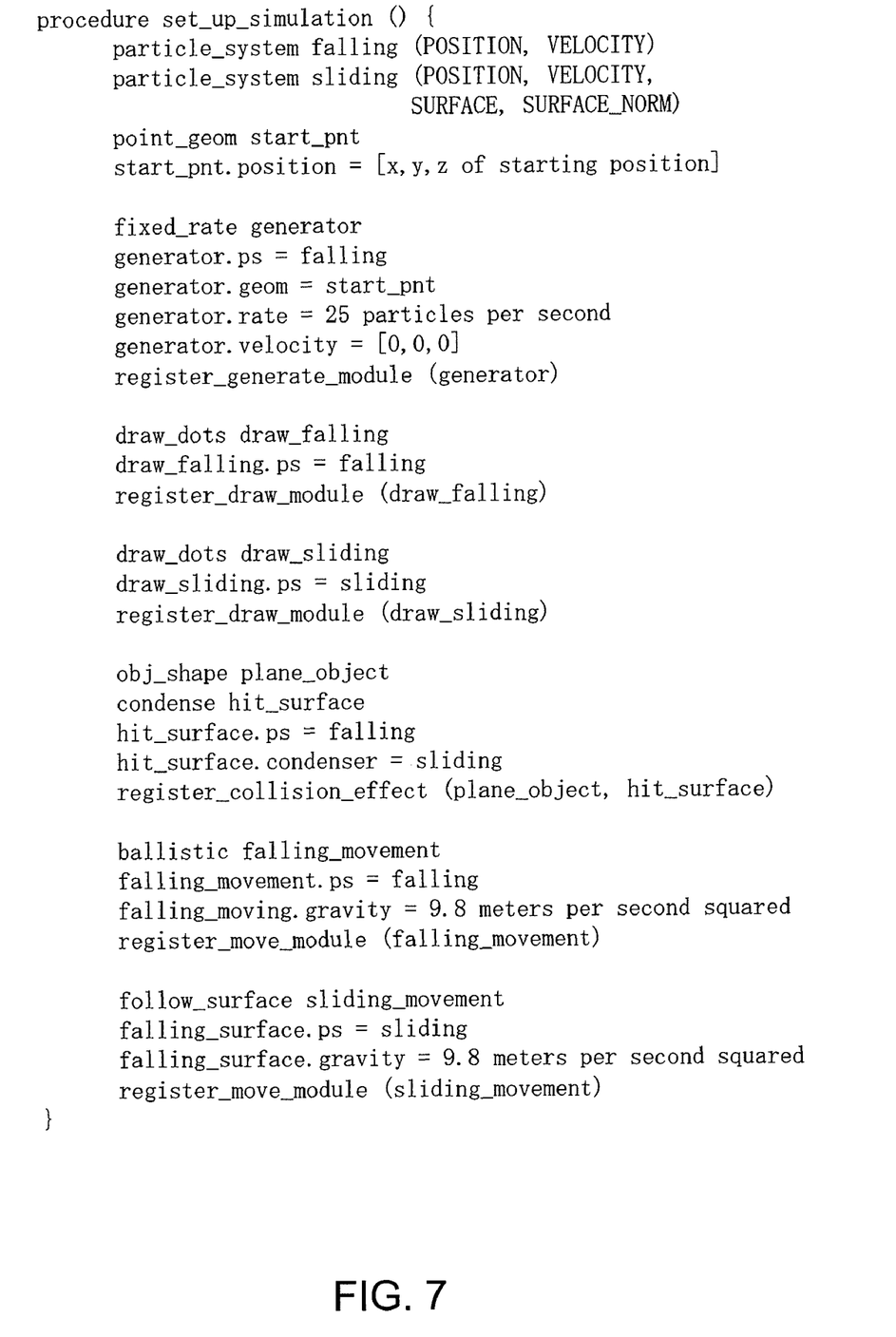
FIG. 7 is an initialization procedure, in accordance with an exemplary embodiment of the present invention, for assembling the modules in FIG. 3 using the class definitions of FIGS. 6A-6C.

The "set_up_simulation" procedure in FIG. 7 represents a programmer-supplied procedure that the simulation system calls to initialize the configuration of the simulation. The set_up_simulation procedure is creating objects that correspond to the objects depicted in FIG. 3 and configuring each object to reference the others in the same manner as FIG. 3. By creating objects that represent the actions of falling and following a surface and the other associated modules, the programmer creates a particle simulation that exhibits the behavior shown in FIG. 2. The procedure creates each object in turn by instantiating the corresponding sub-classes. The instances are then connected to one another by storing references to instances to the appropriate objects. Other data such as floating point numbers and vectors are also configured to conform to the desired properties of the particle simulation.

A system in which exemplary embodiments of the present invention may be implemented will now be described with reference to FIG. 8.

Figure 8:
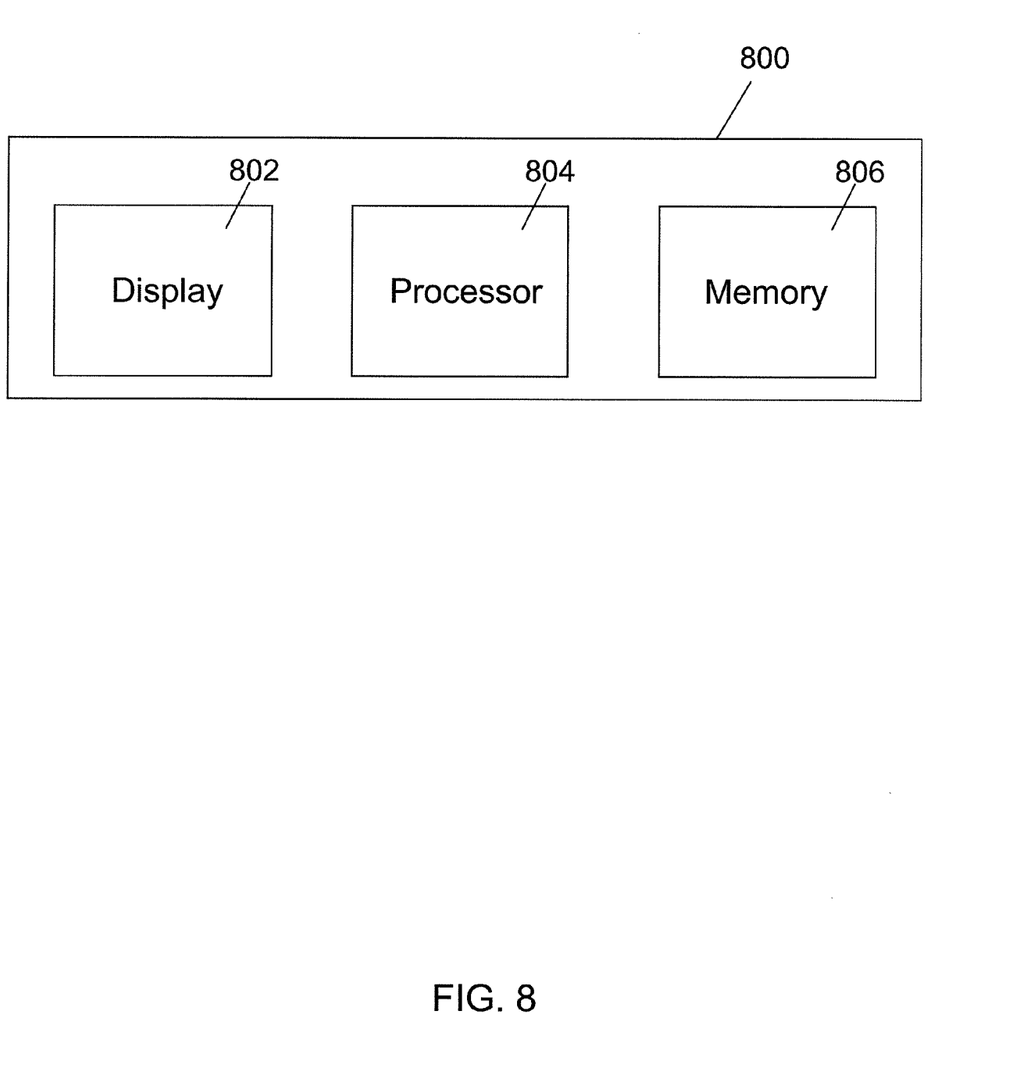
FIG. 8 is a block diagram of a system in which exemplary embodiments of the present invention may be implemented.

As shown in FIG. 8, a 3D physical simulation system 800 includes a processor 804 coupled to a display 802 and a memory 806. The memory 806 may contain a particle system library, which includes the modules of the above-described particle system architecture, for example. The memory 806 may further include a program with program code for simulation of 3D graphical objects. The program may provide a 3D graphical editor as well as an underlying physics engine for producing the simulation. The processor 804 executes the program code and displays the output on the display 802.

It is to be understood that although particle systems, in general, are not new, our architecture for specifying a particle system within a physical simulation environment is new. Existing particle system libraries such as those found in game engines are missing features that are necessary for simulation. Likewise current particle simulations that use a particle system do so through custom implementation and not by using a modular library.

Since the simulation of the particle's state can occur at a different rate than the display of particles to the user, our system needs to cache the particle data. Both having a cache for the particle state array as well as the texture map data for simulating painting, which are needed for our simulation, are not available in current systems.

Our system architecture is divided into the four types of modules for generating particles, moving particles, drawing particles, and handling targets effects. Other systems are concerned mostly with moving and drawing particles. Outside of simulation, particle creation and target handling generally not considered, since in pure graphical animations, the particles are created for the purposes of display and perform no lasting modifications on other objects.

Being able to mix and match modules as described for the present invention is a new feature for simulation particle effects. Normally, the simulation programmer creates the particle system from custom code. Within our module system, however, it is possible to create useful behaviors by combining existing modules as well as by writing ones own modules for the system.

It is to be understood that the architecture described herein is generally designed for specifying a particle system. However, our architecture may be applicable to other kinds of simulations that are similar to those for particle systems. For example, in a finite-element analysis (FEA), the elements in the analysis can be considered particles. By using the invented architecture, the FEA could include more dynamic behaviors such as adding and removing objects from the simulation and having more options for displaying the results of the simulation.

It is to be understood that the present invention may be implemented in various forms of hardware, software, firmware, special purpose processors, or a combination thereof. In one embodiment, the present invention may be implemented in software as an application program tangibly embodied on a program storage device (e.g., magnetic floppy disk, RAM, CD ROM, DVD, ROM, and flash memory). The application program may be uploaded to, and executed by, a machine comprising any suitable architecture.

It should also be understood that because some of the constituent system components and method steps depicted in the accompanying figures may be implemented in software, the actual connections between the system components (or the process steps) may differ depending on the manner in which the present invention is programmed. Given the teachings of the present invention provided herein, one of ordinary skill in the art will be able to contemplate these and similar implementations or configurations of the present invention.

It is to be further understood that the above description is only representative of illustrative embodiments. For convenience of the reader, the above description has focused on a representative sample of possible embodiments, a sample that is illustrative of the principles of the invention. The description has not attempted to exhaustively enumerate all possible variations. That alternative embodiments may not have been presented for a specific portion of the invention, or that further undescribed alternatives may be available for a portion, is not to be considered a disclaimer of those alternate embodiments. Other applications and embodiments can be implemented without departing from the spirit and scope of the present invention.

It is therefore intended, that the invention not be limited to the specifically described embodiments, because numerous permutations and combinations of the above and implementations involving non-inventive substitutions for the above can be created, but the invention is to be defined in accordance with the claims that follow. It can be appreciated that many of those undescribed embodiments are within the literal scope of the following claims, and that others are equivalent.

What is claimed is:

1. An architecture tangibly embodied on a non-transitory computer readable medium, the architecture which, when executed, creates a particle system to be used in a physical simulation, the architecture comprising:
   a plurality of particle generation modules, wherein a particle generation module generates particles in a particle system;
   a plurality of particle motion modules, wherein a particle motion module produces physical motion of particles in a particle system;
   a plurality of particle display modules, wherein a particle display module renders particles in a particle system;
   a plurality of target effect modules, wherein a target effect module modifies particles in a particle system to perform in a certain way when they collide with an object; and
   a plurality of particle data structures, wherein a particle data structure stores and maintains a state of particles in a particle system,
   wherein a particle system for a physical simulation is created by selecting as many of the modules and data structures needed for the physical simulation and combining the selected modules and data structures into a procedure to be run on a computer, and when the procedure is run, the physical simulation of a particular particle's state occurs at a different rate than a rate at which the particular particle is displayed such that data associated with the particular particle's state is stored in a first cache and texture map data associated with the display of the particular particle is stored in a second cache different from the first cache.

2. The architecture of claim 1, wherein a first particle data structure includes a first group of particle data that is updated during the physical simulation and a second group of particle data that is held constant during the simulation, the first group corresponding to the data associated with the particular particle's state, the second group corresponding to the texture map data.

3. The architecture of claim 2, wherein a second particle data structure includes a third group of particle data that is updated during the physical simulation and a fourth group of particle data that is held constant during the simulation, the third group corresponding to data associated with another particle's state, the fourth group corresponding to texture map data associated with the display of the another particle, wherein the first and second particle data structures have different particle data formats, and wherein the particles in the first and third groups of the first and second particle data structures can be transferred from one of the first and second particle data structures to another.

4. The architecture of claim 3, wherein the particles in the first and third groups of the first and second particle data structures are transferred from one of the first and second particle data structures to another via a target effect module or a particle motion module.

5. The architecture of claim 4, wherein the target effect module or the particle motion module effectuates the transfer of a particle in a first location in the first group of the first particle data structure to a corresponding first location in the third group of the second particle data structure by: deleting a particle in the corresponding first location in the third group of the second particle data structure and replacing it with the particle in the first location in the first group of the first particle data structure.

6. The architecture of claim 1, wherein the plurality of particle generation modules, plurality of particle motion modules, plurality of particle display modules, plurality of target effect modules and plurality of particle data structures are stored in a library on the computer.

7. The architecture of claim 1, wherein when the procedure is run on the computer, the physical simulation is rendered on a display connected to the computer.

8. The architecture of claim 1, wherein the physical simulation is a multi-body physics simulation.

9. The architecture of claim 1, further comprising a plurality of placer functions, wherein a placer function identifies a location at which a particle is generated.

10. The architecture of claim 9, wherein the placer functions comprise point placers, shape-based placers, volume placers, sphere placers, and area placers.

11. A method for creating a physical simulation that includes a particle system, comprising:
accessing a particle system library to create a particle system to be included in a physical simulation, the particle system library including:
a plurality of particle generation modules, wherein a particle generation module generates particles in a particle system;
a plurality of particle motion modules, wherein a particle motion module produces physical motion of particles in a particle system;
a plurality of particle display modules, wherein a particle display module renders particles in a particle system;
a plurality of target effect modules, wherein a target effect module modifies particles in a particle system to perform in a certain way when they collide with an object; and
a plurality of particle data structures, wherein a particle data structure stores and maintains a state of particles in a particle system;
retrieving modules from the particle system library that are needed to create the particle system in the physical simulation;
composing the physical simulation to include the particle system by using the retrieved modules; and
executing the physical simulation after it has been composed, and when the physical simulation is executed, the physical simulation of a particular particle's state occurs at a different rate than a rate at which the particular particle is displayed such that data associated with the particular particle's state is stored in a first cache and texture map data associated with the display of the particular particle is stored in a second cache different from the first cache.

12. The method of claim 11, further comprising:
displaying the composed physical simulation as it is being executed.

13. A system for creating a physical simulation of three-dimensional (3D) graphical objects, comprising:
an input unit that receives user input;
a memory that includes a particle system library and program code for physically simulating 3D graphical objects, the particle system library including:
a plurality of particle generation modules, wherein a particle generation module generates particles in a particle system;
a plurality of particle motion modules, wherein a particle motion module produces physical motion of particles in a particle system;
a plurality of particle display modules, wherein a particle display module renders particles in a particle system;
a plurality of target effect modules, wherein a target effect module modifies particles in a particle system to perform in a certain way when they collide with an object; and
a plurality of particle data structures, wherein a particle data structure stores and maintains a state of particles in a particle system;
a processor that executes the program code for physically simulating 3D graphical objects; and
a display that displays the particle system as it is being physically simulated,
wherein the physical simulation of 3D graphical objects is created by selecting as many of the modules and data structures needed for the physical simulation and combining the selected modules and data structures into first program code, and
when the first program code is executed, the physical simulation of a particular particle's state occurs at a different rate than a rate at which the particular particle is displayed such that data associated with the particular particle's state is stored in a first cache and texture map data associated with the display of the particular particle is stored in a second cache different from the first cache.

14. The system of claim 13, wherein the 3D graphical objects comprise a particle system.

* * * * *